United States Patent
Khurana et al.

(10) Patent No.: US 11,079,731 B2
(45) Date of Patent: Aug. 3, 2021

(54) MULTI-SITE BUILDING MANAGEMENT SYSTEM

(71) Applicant: Honeywell International Inc., Morris Plains, NJ (US)

(72) Inventors: Himanshu Khurana, Excelsior, MN (US); John Cronin, Jericho, VT (US); Michael Baker, Georgia, VT (US); Jared P. Faber, Minneapolis, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 15 days.

(21) Appl. No.: 16/595,170

(22) Filed: Oct. 7, 2019

(65) Prior Publication Data

US 2021/0103260 A1    Apr. 8, 2021

(51) Int. Cl.
*G05B 19/042* (2006.01)
*F24F 11/32* (2018.01)

(52) U.S. Cl.
CPC ............ *G05B 19/042* (2013.01); *F24F 11/32* (2018.01); *G05B 2219/2614* (2013.01)

(58) Field of Classification Search
CPC . G05B 19/042; G05B 2219/2614; F24F 11/32
See application file for complete search history.

(56) References Cited

U.S. PATENT DOCUMENTS

| | | | |
|---|---|---|---|
| 6,633,823 B2 | 10/2003 | Bartone et al. | |
| 2012/0065789 A1* | 3/2012 | Scelzi | G01N 25/18 700/291 |
| 2012/0095600 A1* | 4/2012 | Wewalaarachchi | G06Q 10/00 700/275 |
| 2012/0323382 A1 | 12/2012 | Kamel et al. | |
| 2013/0238142 A1* | 9/2013 | Nichols | G05D 23/1934 700/277 |
| 2014/0365021 A1* | 12/2014 | Workman | A01G 25/16 700/284 |
| 2015/0127169 A1 | 5/2015 | Quam et al. | |
| 2015/0127172 A1 | 5/2015 | Quam et al. | |
| 2015/0261229 A1 | 9/2015 | Roy | |
| 2015/0323948 A1 | 11/2015 | Jeong et al. | |
| 2015/0369502 A1* | 12/2015 | Turner | G05B 15/02 700/276 |
| 2017/0074536 A1* | 3/2017 | Bentz | F24F 11/30 |

(Continued)

FOREIGN PATENT DOCUMENTS

| | | |
|---|---|---|
| CN | 103765468 A | 4/2014 |
| KR | 20150128163 A | 11/2015 |
| WO | 2011103652 A1 | 9/2011 |

*Primary Examiner* — Ronald D Hartman, Jr.
(74) *Attorney, Agent, or Firm* — Seager, Tufte & Wickhem, LLP

(57) ABSTRACT

Methods and systems for controlling a building. An illustrative method includes receiving sensor data from one or more sensors of the building, using the received sensor data to control one or more building management components to control one or more environmental conditions within the building, normalizing the sensor data and storing the normalized sensor data, comparing the normalized sensor data with normalized sensor data from one or more other buildings to identify one or more anomalies associated the building, and providing a recommended action to improve at least one of the one or more identified anomalies of the building.

18 Claims, 5 Drawing Sheets

(56) References Cited

U.S. PATENT DOCUMENTS

| | | |
|---|---|---|
| 2017/0336091 A1 | 11/2017 | Arensmeier et al. |
| 2017/0343227 A1* | 11/2017 | Mowris ................ F24F 11/0001 |
| 2018/0202677 A1* | 7/2018 | Endel ........................ F24F 11/30 |
| 2018/0299917 A1 | 10/2018 | Kamel et al. |
| 2018/0364664 A1* | 12/2018 | Gustafson .............. G06Q 50/06 |
| 2019/0033803 A1 | 1/2019 | Chatterjee et al. |
| 2019/0128547 A1* | 5/2019 | Li .......................... G05B 15/02 |
| 2019/0155268 A1 | 5/2019 | Cohen et al. |
| 2019/0212025 A1* | 7/2019 | Martin .................... H04W 4/70 |
| 2020/0041159 A1* | 2/2020 | Kim .................... G05B 13/041 |
| 2020/0226524 A1* | 7/2020 | Bhattacharya ........ G06F 3/0482 |
| 2020/0233391 A1* | 7/2020 | Ma .................... G06Q 30/0633 |

* cited by examiner

MULTI-SITE BUILDING MANAGEMENT SYSTEM

TECHNICAL FIELD

The disclosure generally relates to building management systems, and more particularly to systems and methods for monitoring and/or manipulating conditions in buildings across multiple building sites to identify and initiate efficiency improvements.

BACKGROUND

Buildings in different locations have different needs. For example, buildings in colder climates may need to run furnaces more often, while buildings in warmer climates may need to run air-conditioners more often. Not all differences in efficiency between buildings can be attributed to environmental factors such as indoor and outdoor temperature. For example, some buildings may have less efficient infrastructure (e.g., not enough insulation, inefficient equipment, etc.) and/or may be operated in a less efficient manner. What would be desirable are methods and systems to help isolate differences in building efficiencies across multiple building sites.

SUMMARY

This disclosure generally relates to building management systems, and more particularly to systems and methods for monitoring and/or manipulating conditions in buildings across multiple building sites to identify and initiate efficiency improvements. In one example, a method for controlling a building may include receiving sensor data from one or more sensors of a building, and using the received sensor data to control one or more building management components of the building to control one or more environmental conditions within the building. The sensor data may be normalized and stored. The normalized sensor data may be compared with normalized sensor data from one or more other buildings to identify anomalies associated with the building. Recommended actions may be provided to help improve one or more of the identified anomalies of the building. In some cases, the sensor data may be normalized to take into account one or more outdoor conditions, one or more characteristics of the building, and/or one or more characteristics of the building management components.

In some cases, the method may further include receiving and storing one or more operating parameters of one or more building management components of the building and comparing the normalized sensor data along with one or more of the received operating parameters with normalized sensor data and one or more operating parameters from one more other buildings to identify one or more anomalies associated the building. In some cases, the one or more building management components of the building may be normalized.

In some cases, the sensor data received from the one or more sensors of the building and/or the one or more operating parameters may be timestamped.

In some cases, the method may further include determining when the one or more of the anomalies are caused by an activity of one or more occupants of the building. In some cases, the anomalies that are determined to be caused by the activity of one or more occupants of the building may be automatically ignored.

In some cases, the method may further identify an occupant activity event when an anomaly is determined to be caused by the activity of one or more occupants of the building and the occupant activity event may identify one or more conditions in the building. In some cases an identified anomaly may be automatically ignored when one or more conditions in the building match one or more conditions associated with an identified occupant activity event.

In some cases, a local or remote building controller of the building may use the received sensor data to control the one or more building management components of the building to control the one or more environmental conditions within the building.

In some cases, a cloud server remote from the building may compare the normalized sensor data with normalized sensor data from one more other buildings to identify one or more anomalies associated the building. The cloud server may notify the local building controller of the one or more identified anomalies associated the building.

In some cases, one or more of the anomalies may include a performance anomaly of one or more building management components of the building.

In another example, a method for controlling a building may include receiving sensor data from one or more sensors of the building, using the received sensor data to control one or more building management components of the building to control one or more environmental conditions within the building, receiving one or more operating parameters of one or more building management components of the building, comparing the sensor data and one or more of the operating parameters against a database of sensor data and one or more of operating parameters collected from one more other buildings to identify one or more anomalies associated with the building, determining when one or more of the anomalies are caused by an activity of one or more occupants of the building, and providing a recommended action to improve one or more of the identified anomalies of the building.

In some cases, the method may further include identifying an occupant activity event when an anomaly is determined to be caused by the activity of one or more occupants of the building. The occupant activity event may identify one or more conditions in the building. The anomaly associated with the building may be automatically when one or more conditions in the building match one or more conditions associated with an identified occupant activity event. In some cases, the activity of one or more occupants of the building may include opening a door of the building.

In another example, a system for controlling a building may include e a local building controller and a cloud server. The local building controller may be configured to receive sensor data from one or more sensors of the building and use the received sensor data to control one or more building management components of the building to control one or more environmental conditions within the building. The cloud server may be configured to receive the sensor data from the local building controller, normalize the sensor data, compare the normalized sensor data with normalized sensor data from one more other buildings to identify one or more anomalies associated the building, and provide a recommended action to improve one or more of the identified anomalies of the building.

In some cases, the cloud server may be configured to receive one or more operating parameters of one or more building management components of the building from the local building controller, and to compare the normalized sensor data along with one or more of the received operating parameters with normalized sensor data and one or more operating parameters from one more other buildings to identify the one or more anomalies associated the building.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which.

Figure 1:
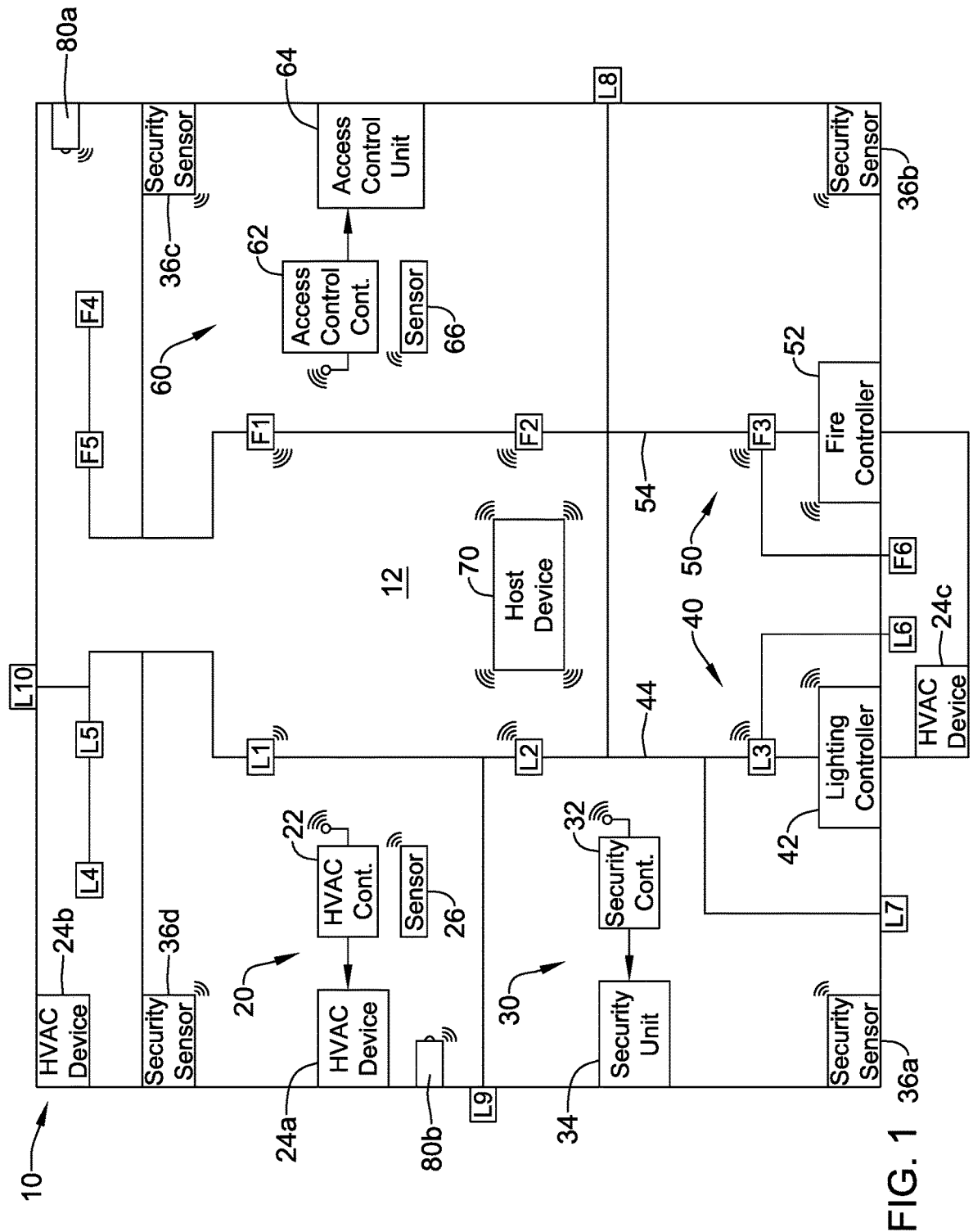
FIG. 1 is a schematic view of an illustrative building or other structure that includes a building management system (BMS) that controls client devices servicing the building.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

A company, business, etc. may operate or be responsible for two or more buildings or facilities in different geographical locations. In some instances, a company may operate hundreds of facilities in various locations (e.g. Walmart). A manager may be tasked with ensuring multiple sites are functioning properly and efficiently. For example, the manager may be tasked with ensuring lighting systems, climate control systems, fire and smoke detection systems, etc. are all functioning and providing a comfortable environment in an efficient manner. The manager may collaborate with and/or rely on the experiences of local building managers of each site to try to determine whether operational inefficiencies exist at any particular site. However, it is difficult to identify those sites that are operating less efficiently relative to the other sites because of the often very different outdoor conditions at each geographic site. That is, is can be difficult to make an apples-to-apples comparison between the operating efficiency of the various buildings located at multiple geographic locations. What would be desirable is to leverage data available from each of multiple sites to help identify, recommend and/or realize inefficiencies in individual buildings even when the buildings are operating at different geographic locations and under very different outdoor conditions.

In some cases, the building sites may be in different geographical locations having different climates, although this is not required. In some cases, the locations may be in a similar geographical location but spaced from one another (e.g., across town) While buildings in different environments may have different needs (e.g., more/less heating and/or cooling), not all differences in efficiency between buildings can be attributed to the environment. For example, some buildings may have less efficient infrastructure (e.g. not enough insulation, inefficient equipment, etc.) and/or may be operated in a less efficient manner. The disclosure generally relates to methods and systems for improving the operational efficiency of one or more buildings using data from a plurality of buildings across a portfolio of buildings.

FIG. 1 is a schematic view of an illustrative building or structure 10 that includes an illustrative building management system (BMS) 12 for controlling one or more client devices servicing the building or structure 10. The BMS 12, as described herein according to the various illustrative embodiments, may be used to control the one or more client devices in order to control certain environmental conditions (e.g., temperature, ventilation, humidity, lighting, etc.). Such a BMS 12 may be implemented in, for example, office buildings, factories, manufacturing facilities, distribution facilities, retail buildings, hospitals, health clubs, movie theaters, restaurants, and even residential homes.

The illustrative BMS 12 shown in FIG. 1 includes one or more heating, ventilation, and air conditioning (HVAC) systems 20, one or more security systems 30, one or more lighting systems 40, one or more fire systems 50, and one or more access control systems 60. These are just a few examples of systems that may be included or controlled by the BMS 12. In some cases, the BMS 12 may include more or fewer systems depending on the industry. For example, some buildings may include refrigeration systems or coolers. In some cases, each system may include a client device configured to provide one or more control signals for controlling one or more building control components and/or devices of the BMS 12.

For instance, in some cases, the HVAC system 20 may include an HVAC control device 22 used to communicate with and control one or more HVAC devices 24a, 24b, and 24c (collectively, 24) for servicing the HVAC needs of the building or structure 10. While the HVAC system 20 is illustrated as including three devices, it should be understood that the structure may include fewer than three or more than three devices 24, as desired. Some illustrative devices may include, but are not limited to a furnace, a heat pump, an electric heat pump, a geothermal heat pump, an electric heating unit, an air conditioning unit, a roof top unit, a humidifier, a dehumidifier, an air exchanger, an air cleaner, a damper, a valve, blowers, fans, motors, and/or the like. The HVAC system 20 may further include a system of ductwork and air vents (not explicitly shown). The HVAC system 20 may further include one or more sensors or devices 26 configured to measure parameters of the environment to be controlled. The HVAC system 20 may include more than one sensor or device of each type, as needed to control the system. It is contemplated that large buildings, such as, but not limited to an office building, may include a plurality of different sensors in each room or within certain types of rooms. The one or more sensors or devices 26 may include, but are not limited to, temperatures sensors, humidity sensors, carbon dioxide sensors, pressure sensors, occupancy sensors, proximity sensors, etc. Each of the sensor/devices 26 may be operatively connected to the control device 22 via a corresponding communications port (not explicitly shown). It is contemplated that the communications port may be wired and/or wireless. When the communications port is wireless, the communications port may include a wireless transceiver, and the control device 22 may include a compatible wireless transceiver. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired.

In some cases, the security system 30 may include a security control device 32 used to communicate with and control one or more security units 34 for monitoring the building or structure 10. The security system 30 may further include a number of sensors/devices 36a, 36b, 36c, 36d (collectively, 36). The sensor/devices 36 may be configured to detect threats within and/or around the building 10. In some cases, some of the sensor/devices 36 may be constructed to detect different threats. For example, some of the sensor/devices 36 may be limit switches located on doors and windows of the building 10, which are activated by entry of an intruder into the building 10 through the doors and windows. Other suitable security sensor/devices 36 26 may include fire, smoke, water, carbon monoxide, and/or natural gas detectors, to name a few. Still other suitable security system sensor/devices 36 may include motion sensors that detect motion of intruders in the building 10, noise sensors or microphones that detect the sound of breaking glass, security card pass systems, or electronic locks, etc. It is contemplated that the motion sensor may be a passive infrared (PIR) motion sensor, a microwave motion sensor, an ultrasonic motion sensor, a tomographic motion sensor, a video camera having motion detection software, a vibrational motion sensor, etc. In some cases, one or more of the sensor/devices 36 may include a video camera. In some cases, the sensor/devices 36 may include a horn or alarm, a damper actuator controller (e.g., that closes a damper during a fire event), a light controller for automatically turning on/off lights to simulate occupancy, and/or any other suitable device/sensor. These are just examples.

In some cases, the lighting system 40 may include a lighting control device 42 used to communicate with and control one or more light banks 44 having lighting units L1-L10 for servicing the building or structure 10. In some embodiments, one or more of the lighting units L1-L10 may be configured to provide visual illumination (e.g., in the visible spectrum) and one or more of the light units L1-L10 may be configured to provide ultraviolet (UV) light to provide irradiation. The lighting system 40 may include emergency lights, outlets, lighting, exterior lights, drapes, and general load switching, some of which are subject to "dimming" control which varies the amount of power delivered to the various building control devices.

In some cases, the fire system 50 may include a fire control device 52 used to communicate with and control one or more fire banks 54 having fire units F1-F6 for monitoring and servicing the building or structure 10. The fire system 50 may include smoke/heat sensors, a sprinkler system, warning lights, and so forth. In some cases, the access control system 60 may include an access control device 62 used to communicate with and control one or more access control units 64 for allowing access in, out, and/or around the building or structure 10. The access control system 60 may include doors, door locks, windows, window locks, turnstiles, parking gates, elevators, or other physical barriers, where granting access can be electronically controlled. In some embodiments, the access control system 60 may include one or more sensors 66 (e.g., RFID, etc.) configured to allow access to the building or certain parts of the building 10.

In a simplified example, the BMS 12 may be used to control a single HVAC system 20, a single security system 30, a single lighting system 40, a single fire system 50, and/or a single access control system 60. In other embodiments, the BMS 12 may be used to communicate with and control multiple discrete building control devices 22, 32, 42, 52, and 62 of multiple systems 20, 30, 40, 50, 60. The devices, units, and controllers of the systems 20, 30, 40, 50, 60 may be located in different zones and rooms, such as a common space area (a lobby, a break room, etc.), in a dedicated space (e.g., offices, work rooms, etc.) or outside of the building 10. In some cases, the systems 20, 30, 40, 50, 60 may be powered by line voltage, and may be powered by the same or different electrical circuit. It is contemplated that the BMS 12 may be used to control other suitable building control components that may be used to service the building or structure 10.

According to various embodiments, the BMS 12 may include a host device 70 that may be configured to communicate with the discrete systems 20, 30, 40, 50, 60 of the BMS 12. In some cases, the host device 70 may be configured with an application program that assigns devices of the discrete systems to a particular device (entity) class (e.g., common space device, dedicated space device, outdoor lighting, unitary controller, and so on). In some cases, there may be multiple hosts. For instance, in some examples, the host device 70 may be one or many of the control devices 22, 32, 42, 52, 62. In some cases, the host device 70 may be a hub located external to the building 10 at an external or remote server also referred to as "the cloud."

In some cases, the building control devices 22, 32, 42, 52, 62 may be configured to transmit a command signal to its corresponding building control component(s) for activating or deactivating the building control component(s) in a desired manner. In some cases, the building control devices 22, 32, 42, 52, 62 may be configured to receive a classification of the building control component and may transmit a corresponding command signal(s) to their respective building control component in consideration of the classification of the building control component.

In some instances, the building control devices 22, 32, 62 may be configured to receive signals from one or more sensors 26, 36, 66 located throughout the building or structure 10. In some cases, the building control devices 42 and 52 may be configured to receive signals from one or more sensors operatively and/or communicatively coupled with the lighting units L1-L10 and the fire units F1-F6 located throughout the building or structure 10, respectively. In some cases, the one or more sensors may be integrated with and form a part of one or more of their respective building control devices 22, 32, 42, 52, 62. In other cases, one or more sensors may be provided as separate components from the corresponding building control device. In still other instances, some sensors may be separate components of their corresponding building control devices while others may be integrated with their corresponding building control device. These are just some examples. The building control devices 22, 32, 42, 52, 62 and the host device 70 may be configured to use signal(s) received from the one or more sensors to operate or coordinate operation of the various BMS systems 20, 30, 40, 50, 60 located throughout the building or structure 10.

The one or more sensors 26, 36, 66, L1-L10, and F1-F6 may be any one of a temperature sensor, a humidity sensor, an occupancy sensor, a pressure sensor, a flow sensor, a light sensor, a video camera, a current sensor, a smoke sensor and/or any other suitable sensor. In one example, at least one of the sensors 26, 36, 66, or other sensors, may be an occupancy sensor. The building control devices 22, 32, 42, 62 and/or the host device 70 may receive a signal from the occupancy sensor indicative of occupancy within a room or zone of the building or structure 10. In response, the building control devices 22, 32, 42, and/or 62 may send a command to activate one or more building control component(s) located in or servicing the room or zone where occupancy is sensed.

Likewise, in some cases, at least one of the sensors 26 may be a temperature sensor configured to send a signal indicative of the current temperature in a room or zone of the building or structure 10. The building control device 22 may receive the signal indicative of the current temperature from a temperature sensor 26. In response, the building control device 22 may send a command to an HVAC device 24 to activate and/or deactivate the HVAC device 24 that is in or is servicing that room or zone to regulate the temperature in accordance with a desired temperature set point.

In yet another example, one or more of the sensors may be a current sensor. The current sensor may be coupled to the one or more building control components and/or an electrical circuit providing electrical power to one or more building control components. The current sensors may be configured to send a signal to a corresponding building control device, which indicates an increase or decrease in electrical current associated with the operation of the building control component. This signal may be used to provide confirmation that a command transmitted by a building control device has been successfully received and acted upon by the building control component(s). These are just a few examples of the configuration of the BMS 12 and the communication that can take place between the sensors and the control devices.

In some cases, data received from the BMS 12 may be analyzed and used to dynamically (e.g., automatically) trigger or provide recommendations for service requests, work orders, changes operating parameters (e.g., set points, schedules, etc.) for the various devices 24, 34, 64, L1-L10, F1-F6 and/or sensors 26, 36, 66 in the BMS 12. It is contemplated that data may be received from the control devices 22, 32, 42, 62, devices 24, 34, 64, L1-L10, F1-F6, and/or sensors 26, 36, 66, as desired. In some cases, the data received from the BMS 12 may be combined with video data from image capturing devices. It is contemplated that the video data may be obtained from certain sensors 26, 36, 66 that are image capturing devices associated with discrete systems 20, 30, 60 of the BMS 12 or may be provided as separate image capturing devices such as video (or still-image) capturing cameras 80a, 80b (collectively 80), as desired. While the illustrative building 10 is shown as including two cameras 80, it is contemplated that the building may include fewer than two or more than two cameras, as desired. It is further contemplated that the cameras (either discrete cameras 80 or cameras associated with a discrete system 20, 30, 60) may be considered to be "smart" cameras (which may be an internet of things (IoT) device) which are capable of independently processing the image stream or "non-smart" cameras which are used as sensors to collect video information which is analyzed by an independent video analytics engine. Some illustrative "non-smart" cameras may include, but are not limited to, drones or thermovision cameras.

It is contemplated that data from the BMS 12 and/or the cameras 26, 36, 66, 80 may be systematically analyzing and compared to data from the BMS and/or cameras of other buildings to identify in efficient resource use that is not directly attributable to outside environmental differences. In some cases the data from the BMS 12 may be compared with data across a portfolio of buildings and may use comparable building types for the comparison. For example, drug store data may be compared with data from other drug stores, hotel data may be compared with data from other hotels, restaurant data may be compared with data from other restaurants, etc. In some cases, the buildings in the building portfolio may be commonly owned, but this is not required. In some cases, a service provider (e.g. Honeywell) may be responsible for monitoring a portfolio of buildings that are owned by multiple franchises (Walmart, CVS, etc.).

Figure 2:
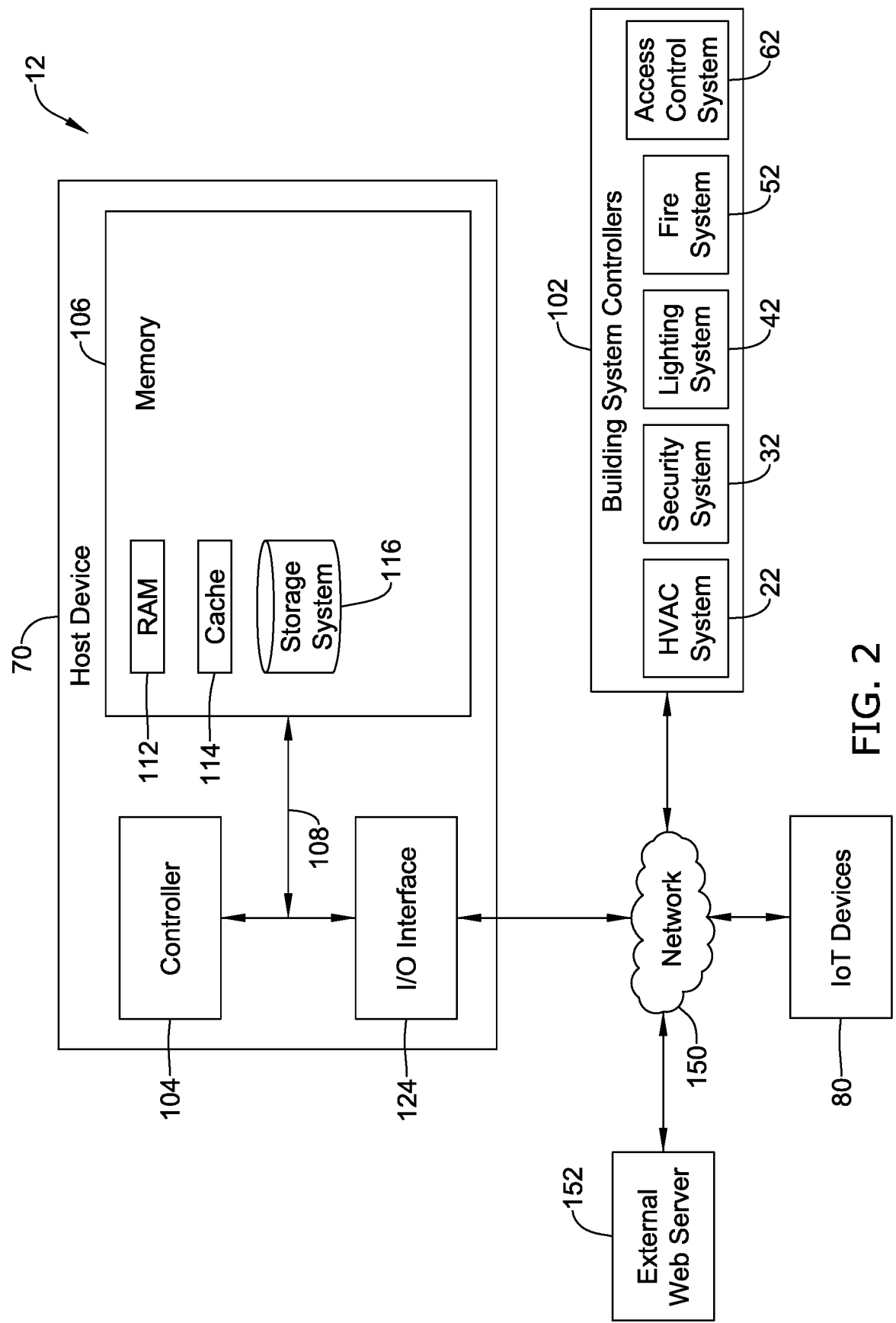
FIG. 2 is a schematic block diagram of the illustrative BMS of FIG. 1.

Referring to FIG. 2, which is a schematic block diagram of the illustrative BMS 12 of FIG. 1, where the host device 70 can function as a server, a client, a local controller, or any other suitable device. In the example shown, the host device 70 can perform various communication and data transfer functions as described herein and can execute one or more application functions. The host device 70 can be any of a variety of computing devices, such as a server computer, a desktop computer, a handheld computer, a tablet computer, mobile telephone or other mobile device, and the like. The components of the host device 70 may include, but are not limited to, a controller 104, a system memory 106, and a bus 108 that couples various system components including the system memory 106 to the controller 104.

The controller 104 may include one or more controllers or processors that execute instructions stored in the system memory 106. The controller 104 may include a programmable microprocessor. Such a programmable microprocessor may allow a user to modify the control logic of the host device 70 even after it is installed in the field (e.g., firmware update, application update). When provided, the bus 108 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The system memory 106 of the host device 70 can include computer system readable media in the form of volatile memory, such as random access memory (RAM) 112 and/or cache memory 114. The host device 70 may further include other removable/non-removable, volatile/non-volatile computer system storage media. By way of example only, the storage system 116 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 108 by one or more data media interfaces.

The building system controllers 102 and/or IoT devices 80 may be connected to the host device 70 through any type of connection such as a network (e.g., network 150), including a local area network (LAN) or a wide area network (WAN), or the connection may be made to an external computer (for example, through the Internet using an Internet Service Provider). In various embodiments, the host device 70 may communicate with one or more devices from the various systems of the building system controllers 102 over the network 150. Such communication can occur via Input/Output (I/O) interface(s) 124. In some cases, the controller 104 of the host device 70 may be operatively coupled to I/O interface(s) 124 via the bus 108, and may use the I/O interface 124 to communicate with devices via the building system controllers 102.

In some cases, the control devices 22, 32, 42, 52, 62 and/or the host device 70 may be programmed to communicate over the network 150 with an external web service hosted by one or more external web servers 152. The control devices 22, 32, 42, 52, 62 and/or the host device 70 may be configured to upload selected data via the network 150 to the external web service 152 where it may be collected, stored, and/or analyzed on the external web server 152. Additionally, the control devices 22, 32, 42, 52, 62 and/or the host device 70 may be configured to receive and/or download selected data, settings, and/or services sometimes including software updates from the external web service over the network 150. The data, settings and/or services may be received automatically from the web service, downloaded periodically in accordance with a control algorithm, and/or downloaded in response to a user request.

Figure 3:
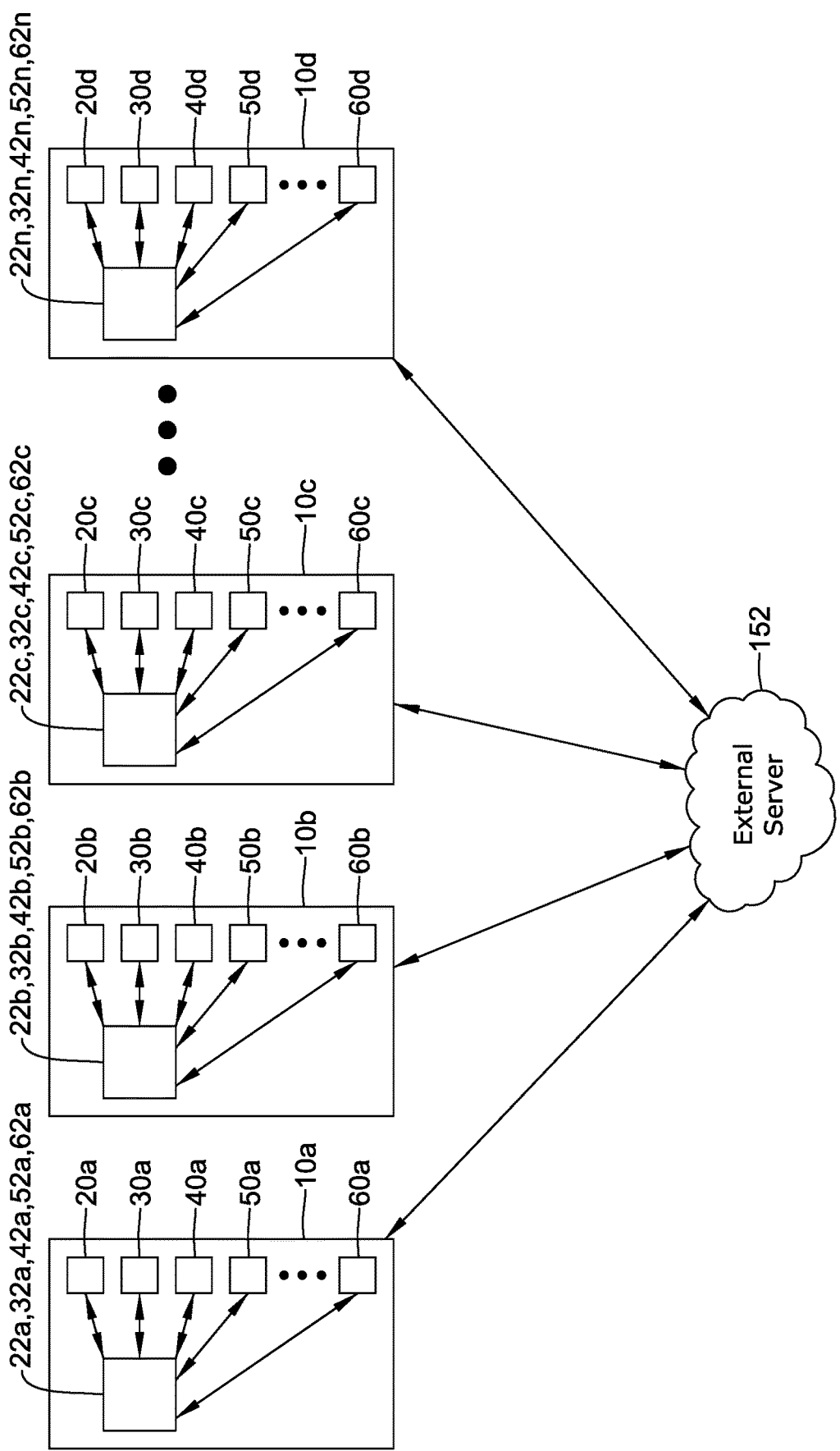
FIG. 3 is a schematic diagram of an illustrative multi-site BMS.

FIG. 3 is a schematic diagram of a plurality of buildings 10a, 10b, 10c, 10n (collectively, 10) each having one or more HVAC control devices 22a-n, one or more security system control devices 32a-n, one or more lighting system control devices 42a-n, one or more fire system control devices 52a-n, and/or one or more access control system control devices 62a-n in communication with an external web server 152, such as the external web server 152 described herein. It is contemplated that devices from any number of buildings 10 may be providing information to the external server 152. In some cases, hundreds, thousands, tens of thousands, or more buildings may be in communication with the external web server(s) 152. The buildings 10a-n may each have one or more of: an HVAC system 20a-n, a security system 30a-n, a light system 40a-n, a fire system 50a-n, and/or an access control system 60a-n, etc. The HVAC system 20a-n, security system 30a-n, light system 40a-n, fire system 50a-n, and/or access control system 60a-n may be in communication with the one another and/or other controller (e.g. host device 70) configured to operate the systems and devices within the respective building 10a-n. The control devices 22a-n, 32a-n, 42a-n, 52a-n, 62a-n from each building may relay performance data, operating parameters, alarm conditions, gas and/or electricity usage, etc. to the external server 152. In some cases, the data may be relayed through a WAN to the external server 152. In some cases, the external server 152 may be configured to aggregate the data obtained from the individual buildings 10a-n. As will be described in more detail herein, once aggregated, the data can be analyzed for trends, outliers, etc., to make changes and/or recommendations for improving the efficiency of one or more of the buildings 10a-n.

Figure 4:
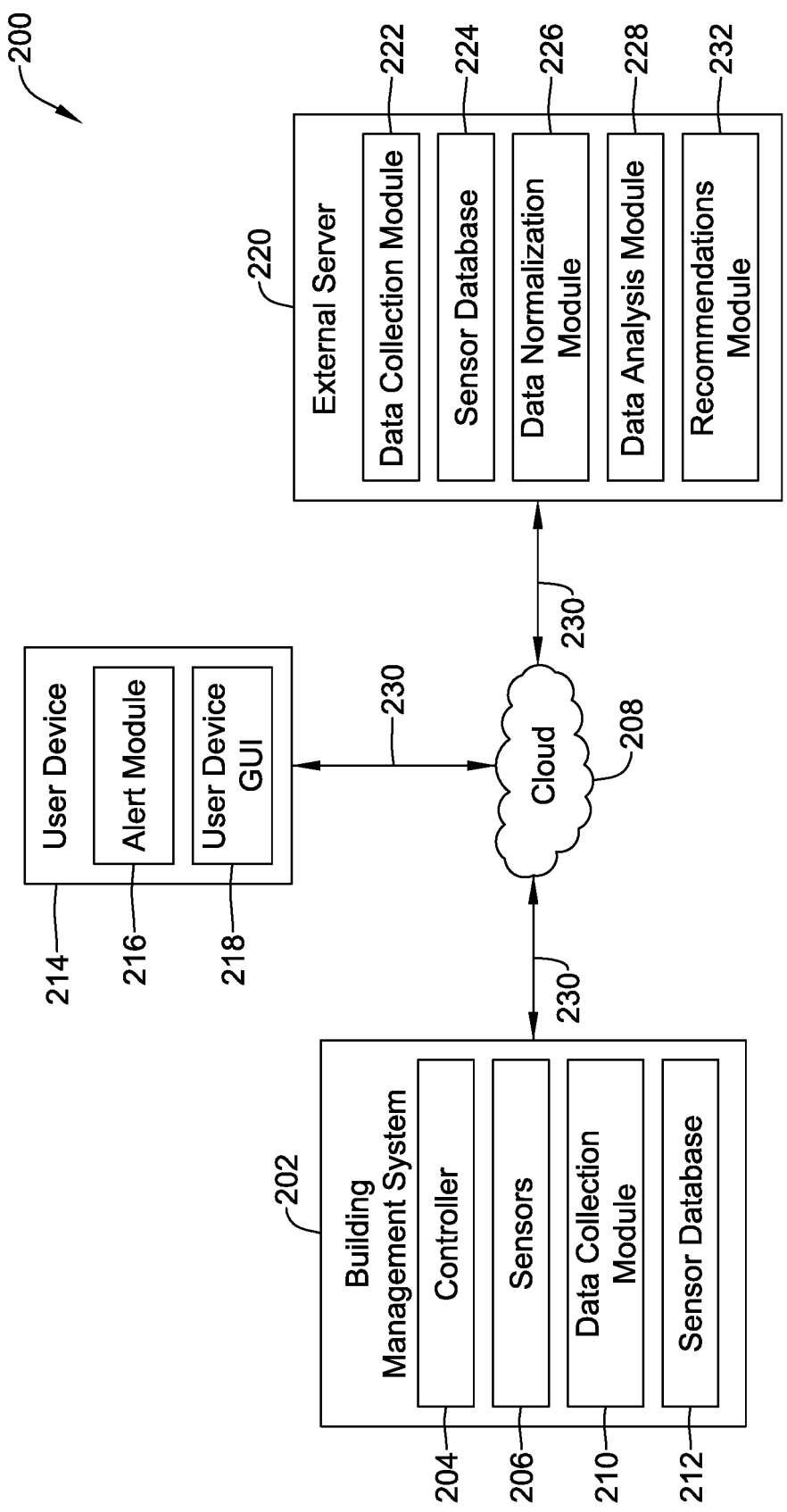
FIG. 4 is a block diagram of an illustrative BMS for controlling a building.

FIG. 4 is a block diagram of an illustrative system 200 for controlling one of the buildings 10a-n. The system 200 may include one or more building management systems 202 positioned within or around a building. The building management system(s) 202 may include, but are not limited to, an HVAC system, a lighting control system, a fire suppression system, a security system, an access control system, internet enabled or "smart" devices, etc. For example, the building management system(s) 202 may be similar in form and function to the building management system 12 described herein. The illustrative building management system 202 includes a controller 204, such as, but not limited to, a host device 70, an HVAC control device 22, a security system control device 32, a lighting system control device 42, a fire system control device, and/or an access system control device 62 described herein. The controller(s) 204 may be similar in form and function to the control devices 22, 32, 42, 52, 62, 70 described above and include the same or similar components and capabilities.

The controller 204 is configured to be in communication with one or more sensors 206 that may be used to detect a condition within or near a space of the building having the building management system(s) 202. The controller 204 may also be configured to use the sensor data to control one or more of the components of the building management system 202 to control the environmental conditions within the building. In some cases, the controller 204 may be located remote from the building, while in other cases the controller 204 may be a local building controller. In some embodiments, the controller 204 may be in communication with the sensors 206 via a cloud network 208, although this is not required. In other embodiments, the controller 204 may be in communication with the sensors 206 via a local network (not explicitly shown) or in direct communication (e.g., via a wired connection), as desired. The sensors 206 may be any type of sensor, device (including IoT devices), or detectable event suitable for operation in or use within a building management system. The sensors 206 may include, but are not limited to, temperatures sensors, humidity sensors, carbon dioxide sensors, occupancy sensors, proximity sensors, motion sensors, limit switches, noise sensors or microphones, video cameras, still image cameras, a horn or alarm, fire, smoke, water, carbon monoxide, and/or natural gas detectors, a damper actuator controller (e.g. that closes a damper during a fire event), connection or disconnection of a device to a network, activation and/or deactivation of IoT devices, passcode entry, a light controller, smart light bulbs, home appliances such as, but not limited to, robotic vacuums, coffee pots, etc., water heaters, voice activated smart speakers (e.g., AMAZON ECHO™ or GOOGLE HOME™), WiFi enabled power outlets, garage door openers, door locks, televisions, speakers, doorbells, water valves, video cameras, wearable devices, radiofrequency receivers, thermal imagers, radar devices, lidar devices, ultrasound devices, etc.

The controller 204 may include a data collection module 210 which may receive sensor data (e.g., the sensed condition) from the sensors 206, and in some cases, operational parameters and/or operational status parameters of the BMS 202. In some embodiments, the data collection module 210 may be a separate portion of the controller 204, although this is not required. The building management system(s) 202 may maintain a plurality of databases including a sensor database that includes data obtained from the sensors 206 and information derived from the sensors 206. Other databases may be provided which include a list of sensor data (e.g., sensed conditions) that occurred in a specific sequence and in a specific time range, data obtained from the one or more sensors 206 aggregated by a predetermined time range, data that has been recorded for a specific action and initiated by the user, operational parameters and/or operational status parameters of the BMS 202, and/or other information as desired. A memory accessible by the processor of the controller 204 may be configured to store the sensor database 212 and/or any other databases such that historical and current data is readily accessible. The controller 204 may also be configured to transmit a notification to a remote user device 214 when an action occurs or to display a notification on a display of the controller 204.

The remote device 214 may be any internet connected device including a smart phone, tablet, e-reader, laptop computer, personal computer, etc. The notification may be received by an alert module 216 within the remote device 214. The alert module 216 may receive a recommended action from the controller 204 and display the action on a display or guided user interface (GUI) 218 of the user device 214. The alert module 216 may be a part of an application program code (app) running on the remote device 214, although this is not required. It is contemplated that the user may customize who or what device(s) receives notifications and when notifications are sent or received via the user app 232 or controller 204. For example, the building management system 202 may be in communication with more than one user and/or more than one user device. Once the notification has been received at the alert module 216, the notification may be displayed on a user interface 228 of the device 214. In some cases, an audio alert (e.g., a beep or chime) or a haptic alert (e.g., a vibration) may accompany the notification to alert the user of the notification.

The system 200 may further include one or more external servers 220. The building management system 202, the remote user device 214, sensors 206, and external server 220 may communicate with one another via a network 230. The network 230 may be, for example, a wide area network or global network (WAN), such as the Internet. The external server(s) 220 may be a suite of hardware and software which may sometimes be referred to as "the cloud." In some cases, the communication may pass through an intermediary server 208 or cloud network, but this is not required. In some cases, the cloud 208 may provide the ability for communication amongst the building management system(s) 202, sensors 206, the external server(s) 220, and/or one or more remote devices 214. While the external server(s) 220 is illustrated as connected to a single building having a building management system(s) 202, the external server(s) 220 may be connected to a plurality of building management systems as described with respect to FIG. 3.

The external server(s) 220 may collect and store data from the various sensors 206 from the one or more connected building management systems 202. The data from the sensors 206 may be collected by a data collection module or controller 222 and stored in a sensor and/or other database 224 at the external server(s) 220. The sensor data may be time stamped and/or date stamped to provide additional contextual information (e.g., time of day, building usage at said time of day, outdoor conditions, etc.). In some cases, the external server(s) 220 may collect and store one or more operating parameters of the building management system components. For example, the external server(s) 220 may collect temperature set points, automated lighting schedules, etc. This data may be stored with the sensor data in the sensor database 224 or in another database, as desired. The operating parameters data may be time stamped and/or date stamped to provide additional contextual information (e.g., time of day, building usage at said time of day, outdoor conditions, etc.). As will be described in more detail herein, the operating parameters of the building management system may be used to compare to other building management systems to determine if changes in the operating parameters may increase the operational efficiency of the building. It is further contemplated that additional contextual data related to the building(s) may be stored in the external server 220, sometimes in the sensor database 224, including, but not limited to, occupancy, building size, overall building utilization (store, warehouse, etc.), time stamped weather data (temperature, humidity, wind direction and speed, solar index, sunrise, sunset, etc.) at the particular geographical location of the building, etc.

The external server 220 may further include a data normalization module 226. The data normalization module 226 may be configured to normalize the sensor data and/or the operating parameters. Some illustrative data that may be normalized includes, but is not limited to, equipment run time, equipment energy usage, refrigerant pressure, pressure drop across a filter, sensor readings, etc. In some cases, the data may be normalized for outdoor conditions (e.g., weather, sunrise, sunset, etc.) and/or other factors such as, but not limited to building size, building equipment (BTU, TONS, Efficiency Rating, etc.), building size or other building characteristics, number of times a cooler door is opened and/or closed, number of times people enter and/or exit the building, and/or other characteristics of the building and/or building management system components (e.g., energy efficiency, etc.). The normalized data may be stored in the sensor database 224, or other database, as desired. In some cases, the data may be normalized by grouping the data according to the location and/or geographical region of the building management system 202 so as to normalize out significant variations in weather or other outdoor conditions, building construction codes, etc., that may differ across geographic regions.

In some cases, normalization of the data may include grouping data sets by a particular attribute, such as, but not limited to climate. In one example, to normalize data for outdoor conditions, the geographic location of each building 10a-n within the system 200 may be overlaid on a climate map representing the prevailing weather patterns of a given area. A climate map may include a conventional map overlaid with colors representing climate zones. Climate maps may take into consideration precipitation, temperature, seasonal variations, and/or geographical features and are readily available for mores regions of the world. Buildings 10a-n within a climate zone can be compared with other buildings within the same climate zone to help normalize out large variations in climate. In some cases, an application programming interface (API) may provide actual contemporary environmental conditions (e.g. temperature, humidity, solar index, wind speed and wind direction, participation, altitude, etc.) from a weather service. The buildings may then be grouped based on key performance indicators (KPIs) such as, but not limited to temperature, humidity, solar index, wind speed and wind direction, participation, altitude, etc.

In some cases, buildings 10a-n may be grouped by an average temperature or average temperature and average humidity over a period of time. In one example, buildings 10a-n may be grouped if they are in a location having an average temperature within a certain percentage (e.g., 75° F. +/−5%) over a period of time (e.g. a period of minutes, hours, days, weeks, months, etc.). The groupings may change based on the real time data. As indoor climate control may vary based on other outdoor conditions (e.g., temperature, humidity, etc.), additional or other variables may be included in the grouping criteria. It is contemplated that increasing the grouping criteria may increase the number of groups of buildings but may also increase accuracy of the normalization.

In another example, normalization of the data may include generating scaled and/or shifted versions to allow for comparisons of corresponding normalized data across different data sets. For example, the data may be scaled and/or shifted to allow for data comparison of buildings in different climates in a way that minimizes or eliminates the influences of external factors such as climate conditions. It is contemplated that the data may be scaled and/or shifted to account for other gross influencers, as desired. For example, it may be expected that an air conditioning system may have higher run times per period of time in a hot climate (e.g. Phoenix, Ariz.) relative to a cooler or moderate climate (Minneapolis, Minn.). The run times of systems in such different climates can be normalized or adjusted based on their corresponding outdoor conditions (e.g. temperature, humidity, solar index, wind speed and wind direction, participation, altitude, etc.) and then compared to determine if one or more of the building management systems is experiencing an anomaly such as reduced performance.

The external server 220 may further include a data analysis module 228. The data analysis module 228 may be configured to analyze the normalized sensor data. For example, the analysis module 228 may be configured to determine the mean, median and/or any outliers for a particular type of data. Some illustrative data types may include, but are not limited to, energy usage of individual systems and/or components within the systems (HVAC system, lights, refrigeration, etc.), water usage, etc. In some embodiments, the data analysis module 228 may be configured to predict resource consumption (e.g., energy, water, etc.) for a particular building based on at least one type of non-sensor data including, but limited to geographic location and/or average outdoor temperature, etc.

The data analysis module 228 may be configured to compare the normalized data from a first building to the normalized data from one or more other buildings to identify one or more anomalies associated the first building. The buildings used for comparison may be of a same use type and/or within the same category of building. The one or more anomalies may correspond to resource use that is not associated with outside environmental differences in building locations. For example, an HVAC system that is using more energy than expected compared to the predicted resource consumption and/or the normalized data from other building management systems may be considered an anomaly. Further analysis of the energy usage of the anomalous HVAC system either at the external server 220 and/or at the building or system controller 204 may help identify a root-cause and subsequently a recommended action, as will be described in more detail herein. Additionally or alternatively, the operating parameters of the building management system 202 of the first building may be compared to the operating parameters from one or more other buildings to identify one or more anomalies associated the building. For example, the comparison of operating parameters may reveal that the first building is leaving more lights illuminated when the building is unoccupied compared to the one or more other buildings. A recommendation may be to change the lighting schedule of the offending building.

In some cases, the data analysis module 228 may be further configured to determine if the one or more anomalies are associated with the activity of one or more occupants of the building. It is contemplated that the data analysis module 228 may be configured to identify an occupant activity event when one or more anomalies are associated with an activity of one or more occupants of the building. The occupant activity event may be associated with one or more predetermined conditions in the building. In one example, an occupant activity event may be an exterior door remaining open for a period of time. The associated one or more predetermined conditions may be a temporary increase in energy consumption of the HVAC system which can be correlated to the length of time that the door remained open. For example, an increased cooling cost for a particular day (and a particular building) may be associated with an exterior door remaining open for a long period of time. In some cases, the activity of the occupants can be inferred by or detected by one or more of sensors. For example, a limit switch on a door may remain open for a period of time indicating that the door has remained open. In another example, a surveillance camera may monitor whether the door is open or closed, along with other use activities. The impact of the occupant's activity on the resource usage may be further verified by an increase in the resource usage. For example, having a door temporarily propped open may incur a temporary increase in energy consumption whereas a mechanical problem with a component of the HVAC system may incur an ongoing increase in energy consumption.

The external server 220 may further include a recommendations module 232. The recommendations module 232 may be configured to provide recommended actions based on a rules framework. In some cases, the recommendations module 232 may transmit a recommended action to the controller 204 and/or directly to the user device 214. The recommended action may include maintenance suggestions, equipment replacement, structural changes, operating parameter modifications, alerts to indicate energy waste (e.g., an audible notification when n exterior door or a cooler door has remained open for greater than a predetermined length of time), changes to occupant behavior, etc.

It is contemplated that in some instances, the recommendations module 232 may remotely effect the recommended action. For example, the recommendations module 232 may be configured to change an operating parameter (e.g., temperature set point, heating/cooling schedule, lighting schedule, etc.) of the building management system 202 at the building controller 204. In some cases, when the data analysis module 228 has determined the one or more anomalies are due to an activity of the occupant and/or an occupant activity event, the recommendations module 232 may automatically ignore the one or more anomalies. It is further contemplated that the recommended action provided by the recommendations module 232 may take into consideration occupant comfort (temperature, humidity, lighting, total energy consumption, occupancy of the building, food safety, etc.). In other words, the recommendations module 232 may not recommend actions that would be detrimental to the building occupants and/or enterprise.

Generally, the remote server 220 may use global analytics of buildings across a building portfolio to identify or predict a problem or issue at a specific building. The remote server 220 may compare normalized data collected from sensors 206 of a building to other normalized data collected from sensors in one or more other buildings (of similar property types) to determine if there are changes or modifications that can/should be made to the control logic and/or components of the building management system 202 to improve the operational efficiency of the building. In some cases, the data normalization and/or analysis may be performed in a cloud server remote from the building. In other cases, at least some of the data normalization and/or data analysis may be performed locally at the building controller 204. Recommended actions may be provided to a user. In some cases, the actions may be user defined or suggested by the external server 220 and/or the controller 204. The system 200 may continuously analyze the sensor data, or analyze the data at predetermined intervals (e.g., days, months, years, etc.). In some cases, the external server 220 may be configured to identify trends in resource usage over a time, and predict when a recommended change may be needed or desired.

Figure 5:
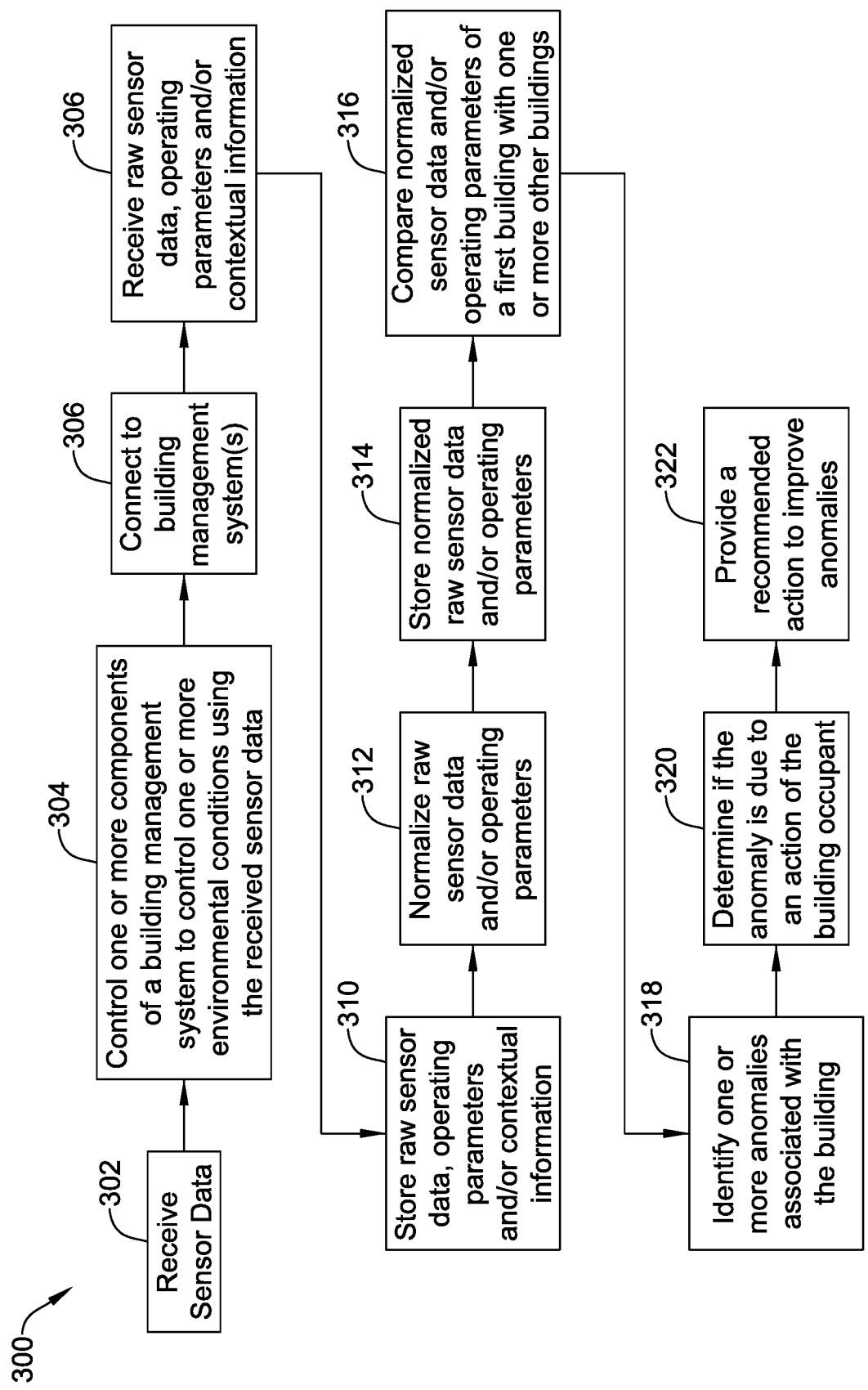
FIG. 5 is an illustrative flow chart of an illustrative method of controlling a building.

FIG. 5 is an illustrative flow chart of a method 300 of controlling a building. The illustrative method 300 begins with the controller 204 of a building management system 202 in a building receiving data from the plurality of sensors 206, as shown at block 302. The controller 204 may use the received sensor data to control one or more components of the building management system 202 to control one or more environmental conditions within the building, as shown at block 304. The environmental conditions may include, but are not limited, temperature, humidity, lighting, etc. An external server or cloud server 220 may establish a connection to the building management system 202, as shown at block 306. It is contemplated that the external server 220 may be connected to the building management system 202 while the controller 204 is receiving sensor data (block 302) and controlling the BMS 202 (block 304). The external server 220 may request data from the sensors 206 and/or operating parameters of the BMS. Alternatively, the controller 204 may be configured to automatically send the data from the sensors 206 and/or operating parameters of the BMS 202.

The data collection module 222 of the external server 220 may receive the raw sensor data, operating parameters and/or contextual information for the building, as shown at block 308. It is contemplated that the data collection module 222 may be collecting data from one or more additional buildings sometimes substantially simultaneously therewith. The data collection module 222 may store the raw sensor data, operating parameters and/or contextual information for the building in a sensor and/or other database 224, as shown at block 310. In some cases, any or all of the raw sensor data, operating parameters and/or contextual information for the building may be timestamped and/or date stamped.

The data normalization module 226 may then normalize the raw sensor data and/or operating parameters for the building, as shown at block 312. The normalized sensor data and/or operating parameters may be stored in a database in the external server 220, as shown at block 314. In some embodiments, the normalized sensor data and/or operating parameters may be stored in the sensor database 224, although this is not required. The normalized sensor data and/or operating parameters may be stored with normalized data form one or more additional buildings.

The data analysis module 228 may then compare the normalized sensor data and/or operating parameters for the building to the normalized sensor data and/or operating parameters for one or more additional buildings, as shown at block 316. In some cases, the normalized sensor data and/or operating parameters for the building may additionally or alternatively be compared to a predicted resource usage, as described above. The data analysis module 228 may then identify one or more anomalies associated with the building based on the comparison with data from other buildings and/or predicted usage, as shown at block 318. In some cases, the data analysis module 228 may determine if any of the one or more anomalies are due to an activity of the occupants of the building, as show at block 320. If the one or more anomalies are due to an activity of the occupants of the building, the data analysis module 228 may automatically ignore the anomaly associated with activity of the occupant.

The data analysis module 228 may send the one or more anomalies to a recommendations module 232. The recommendations module 232 may provide a recommended action to improve at least one of the one or more identified anomalies of the building. In some embodiments, the recommended action may be a notification sent to a user identifying maintenance activities, control changes, equipment replacements, etc. that may improve at least one of the one or more identified anomalies of the building. Alternatively, or additionally, the recommended action may be a modification to a control parameter of the BMS 202 which is automatically delivered to the controller 204 by the external server 220.

While the data normalization, data analysis and recommendations are described as being performed at the remote server 220, it should be understood that some or all of these tasks may be performed at the controller 204 of the BMS 202. Further, the controller 204 of the BMS 202 may be a plurality of controllers or a host device, as described above. In some cases, the controller 204 of the BMS 202 may be local to the building or remote from the building.

The various modules described herein disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method for controlling a building, the method comprising:
   receiving sensor data from one or more sensors of the building;
   using the received sensor data to control one or more building management components of the building to control one or more environmental conditions within the building;
   normalizing the sensor data and storing the normalized sensor data;
   comparing the normalized sensor data with normalized sensor data from one or more other buildings to identify one or more anomalies associated with the building;
   determining when the one or more anomalies are caused by an activity of one or more occupants of the building;
   ignoring any of the one or more anomalies that are determined to be caused by the activity of one or more occupants of the building; and
   providing a recommended action to improve at least one of the one or more identified anomalies of the building.

2. The method of claim 1, wherein the sensor data is normalized to take into account one or more outdoor conditions.

3. The method of claim 1, wherein the sensor data is normalized to take into account one or more physical characteristics of the building including building size.

4. The method of claim 1, wherein the sensor data is normalized to take into account one or more characteristics of the one or more building management components including one or more of BTU, TONS, and efficiency rating.

5. The method of claim 1, further comprising:
receiving and storing one or more operating parameters of one or more building management components of the building; and
comparing the normalized sensor data along with one or more of the received operating parameters with normalized sensor data and one or more operating parameters from the one or more other buildings to identify one or more anomalies associated the building.

6. The method of claim 5, wherein the one or more operating parameters of one or more building management components of the building are normalized.

7. The method of claim 5, further comprising:
timestamping the sensor data received from one or more sensors of the building; and
timestamping the received one or more operating parameters.

8. The method of claim 1, identifying an occupant activity event when an anomaly is determined to be caused by the activity of one or more occupants of the building, wherein the occupant activity event identifies one or more conditions in the building.

9. The method of claim 8, further comprising automatically ignoring an identified anomaly associated the building when the one or more conditions in the building match one or more conditions associated with an identified occupant activity event.

10. The method of claim 9, wherein a local building controller of the building uses the received sensor data to control the one or more building management components of the building to control the one or more environmental conditions within the building.

11. The method of claim 10, wherein a cloud server remote from the building compares the normalized sensor data with normalized sensor data from one more other buildings to identify the one or more anomalies associated the building, and wherein the cloud server notifies the local building controller of the one or more identified anomalies associated the building.

12. The method of claim 1, wherein a building controller of the building uses the received sensor data to control the one or more building management components of the building to control the one or more environmental conditions within the building.

13. The method of claim 1, wherein the one or more anomalies comprises a performance anomaly of one or more building management components of the building.

14. A method for controlling a building, the method comprising:
receiving sensor data from one or more sensors of the building;
using the received sensor data to control one or more building management components of the building to control one or more environmental conditions within the building, the one or more building management components using one or more energy resources;
receiving one or more operating parameters of one or more building management components of the building;
comparing the sensor data and the one or more operating parameters against a database of sensor data and one or more of operating parameters collected from one more other buildings to identify one or more anomalies associated with the building;
determining when the one or more anomalies are caused by an activity of one or more occupants of the building, the activity causing a change in energy resource usage by one or more of the building management components; and
providing a recommended action to improve at least one of the one or more identified anomalies of the building.

15. The method of claim 14, further comprising:
identifying an occupant activity event when an anomaly is determined to be caused by the activity of one or more occupants of the building, wherein the occupant activity event identifies one or more conditions in the building; and
automatically ignoring an anomaly associated with the building when the one or more conditions in the building match one or more conditions associated with an identified occupant activity event.

16. The method of claim 15, wherein the activity of one or more occupants of the building comprises opening a door of the building.

17. A system for controlling a building, the system comprising:
a local building controller configured to control one or more building management components of the building to control one or more environmental conditions within the building, the local building controller configured to:
receive sensor data from one or more sensors of the building;
use the received sensor data to control the one or more building management components of the building to control the one or more environmental conditions within the building;
a cloud server comprising a processor, the cloud server configured to:
receive the sensor data from the local building controller;
normalize the sensor data using the processor, wherein the sensor data is normalized based on:
one or more characteristics of the one or more building management components including one or more of BTU, TONS, and efficiency rating; and/or
a number of times a door of the building is opened and/or closed;
compare the normalized sensor data with normalized sensor data from one more other buildings to identify one or more anomalies associated the building; and
provide a recommended action to improve at least one of the one or more identified anomalies of the building.

18. The system of claim 17, wherein the cloud server is configured to receive one or more operating parameters of one or more building management components of the building from the local building controller, and compare the normalized sensor data along with one or more of the received operating parameters with normalized sensor data and one or more operating parameters from one or more other buildings to identify the one or more anomalies associated the building.

* * * * *